(12) United States Patent
Monti

(10) Patent No.: US 8,776,984 B2
(45) Date of Patent: Jul. 15, 2014

(54) METHOD FOR TRANSFERRING ARTICLES PICKED UP FROM SEVERAL CHANNELS TO A SUPPLY LINE OF A PACKING MACHINE

(75) Inventor: Giuseppe Monti, Pianoro (IT)

(73) Assignee: Marchesini Group S.p.A., Pianoro (BO) (IT)

( * ) Notice: Subject to any disclaimer, the term of this patent is extended or adjusted under 35 U.S.C. 154(b) by 228 days.

(21) Appl. No.: 13/252,599

(22) Filed: Oct. 4, 2011

(65) Prior Publication Data

US 2012/0093625 A1    Apr. 19, 2012

(30) Foreign Application Priority Data

Oct. 15, 2010    (IT) .............................. BO2010A0619

(51) Int. Cl.
*B65G 47/12*    (2006.01)

(52) U.S. Cl.
USPC ............ 198/432; 198/433; 198/443; 198/448

(58) Field of Classification Search
USPC .......... 198/432, 433, 429, 430, 443, 448, 450
See application file for complete search history.

(56) References Cited

U.S. PATENT DOCUMENTS

| 3,860,132 | A | * | 1/1975 | Stuart et al. | .................... | 414/809 |
| 5,456,563 | A | * | 10/1995 | Halbo | ...................... | 414/416.06 |
| 7,770,363 | B2 | * | 8/2010 | Monti | .............................. | 53/475 |

FOREIGN PATENT DOCUMENTS

| DE | 102005023810 A | 11/2006 |
| EP | 0989080 A | 3/2000 |
| EP | 1164099 A | 12/2001 |
| EP | 2030894 A | 3/2009 |

OTHER PUBLICATIONS

European Search Report for EP 2441687, Dated Feb. 28, 2012, 3 pages.

* cited by examiner

*Primary Examiner* — Ramya Burgess
*Assistant Examiner* — Lester Rushin
(74) *Attorney, Agent, or Firm* — William J. Sapone; Ware Fressola Maguire & Barber LLP

(57) ABSTRACT

In the present method, which includes use of an operating head, groups of articles are intermittently picked up from a plurality of identical flanked channels (10, 20, 30) which bear articles (3) equidistanced from one another. The articles are ordered in groups in identical flanked lines ($F_1$, $F_2$, $F_3$) and in a number that is equal to the number of channels. In the method, each group of articles is transferred above a supply line (40) provided with equidistanced compartments corresponding to the articles arranged on the channels. Each line of articles is unloaded into underlying compartments (4) of a series of compartments in the line. It is thus possible to insert into the compartments of a series of compartments an equal, smaller or greater number of articles than the number of channels.

4 Claims, 16 Drawing Sheets

METHOD FOR TRANSFERRING ARTICLES PICKED UP FROM SEVERAL CHANNELS TO A SUPPLY LINE OF A PACKING MACHINE

DESCRIPTION OF THE PRIOR ART

High-productivity machines are known (e.g. blister machines), which are able to supply articles in outlet (e.g. blister packs) arranged on one or more equidistanced channels.

These articles must be transferred into suitable seatings (for example compartments) arranged in a supply line of a packing machine (for example a boxing machine).

SUMMARY OF THE INVENTION

The aim of the invention is to disclose a method which enables contemporaneously picking-up, from channels supplying articles, a group of articles in a same number from each channel and to transfer the articles into the compartments in the supply line of the groups of articles, to define a predetermined number of the articles in each compartment, all performed in the presence of a continuous movement of both the channels and the line.

A further aim of the invention is to provide an extremely versatile method able to vary, simply and rapidly, the number of articles to be inserted in each compartment in the line.

The above aims are attained in accordance with the invention. In particular, the invention discloses how to insert a number of articles equal to the number of channels in each compartment in the line. The invention also discloses how to fill each compartment in the line with a number of articles that is lower than the number of channels but greater that the unit. The invention further discloses technical-functional teaching relating to locating a number of articles greater than the number of channels in each compartment in the line. Lastly, the invention discloses how to insert a single article in each compartment in the line.

BRIEF DESCRIPTION OF THE DRAWINGS

The characteristics of the invention are illustrated in the following, with reference to the accompanying figures of the drawings, in which.

DESCRIPTION OF PREFERRED EMBODIMENTS

Figure 1A:
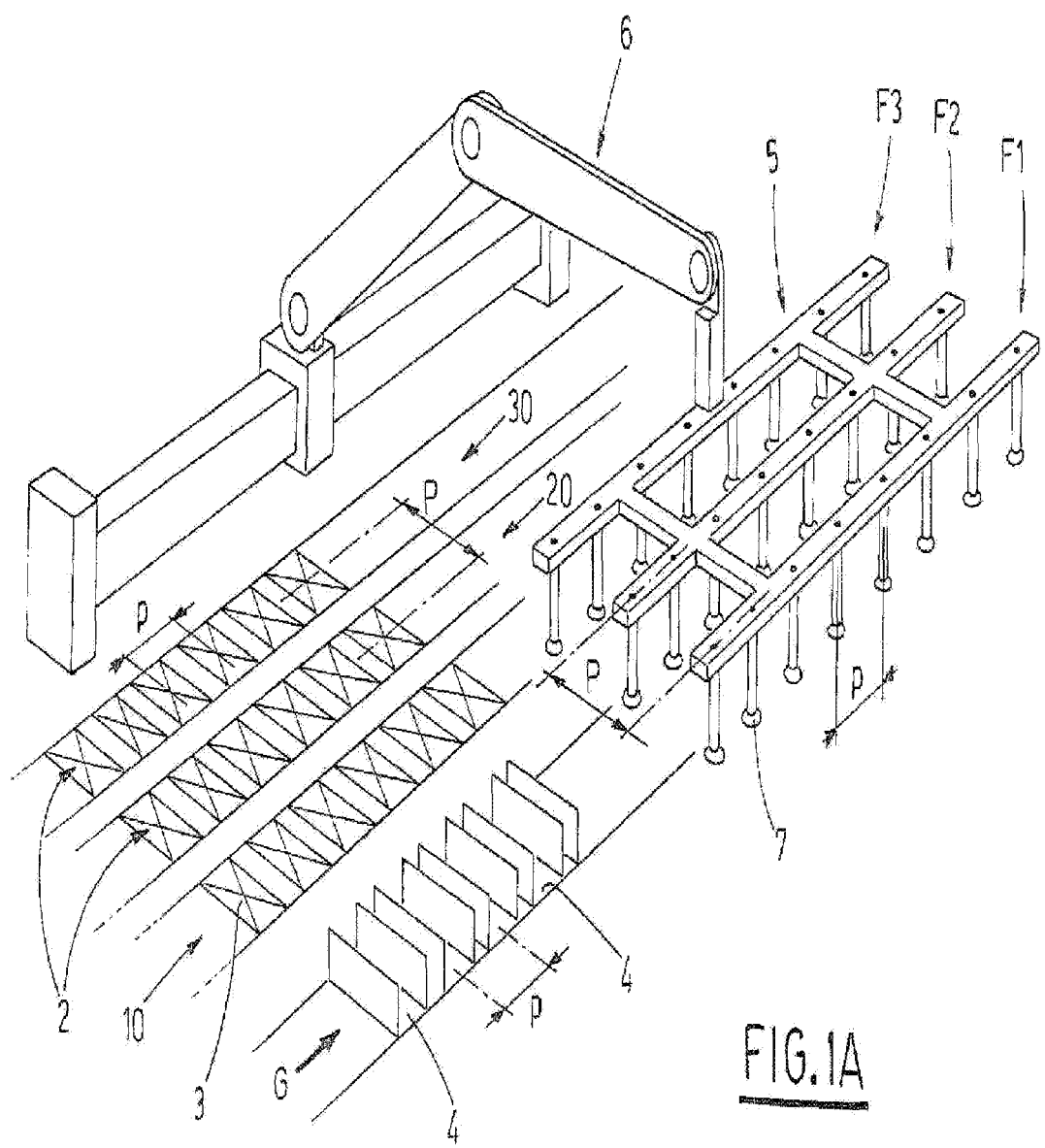
FIG. 1A schematically illustrates, in a perspective view, the channels and the supply line, as well as the means which together actuate the method.
Figure 1B:
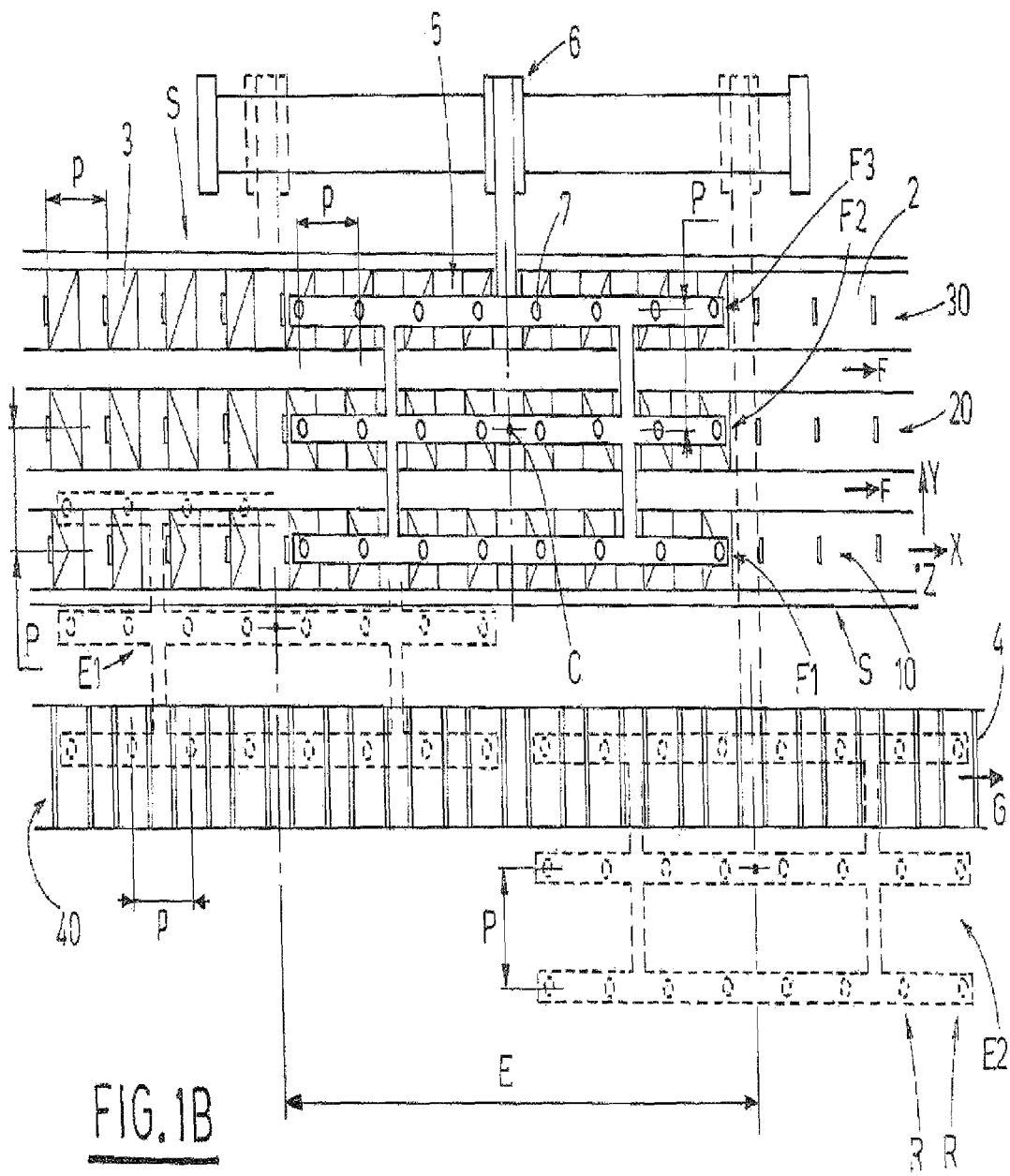
FIG. 1B schematically illustrates, in plan view, what is illustrated in FIG. 1A.

With reference to FIG. 1, three channels, 10, 20 and 30, are continuously and synchronically moved (direction F), mutually distanced transversally according to a transversal pitch P, exhibiting seatings 2 that are equidistanced along a longitudinal pitch p; each seating of a channel is aligned transversally with corresponding seatings 2 of the remaining channels to define transversal segments S.

A supply line 40 of a packing machine (not illustrated), is continuously moved in direction G, for example a same direction as direction F of the moving channels.

The line 40 is provided with compartments 4 which are equidistanced in the longitudinal pitch p: the compartments are destined to receive one or more of the articles.

In the illustrated example the line 40 is parallel to the channels 10, 20, 30 and the height can be the same as or different from the height of the channels.

An operating head 5 of a robot means 6, denoted generically, is movable according to the Cartesian axes X, Y and Z.

The head 5 is provided with three parallel lines of pick-up means $F_1$, $F_2$, $F_3$ of aspirating suckers 7 (in the illustrated example eight suckers per line), with the central line distanced from the adjacent rows according to the transversal pitch P; the suckers 7 of each row are equidistanced according to the longitudinal pitch p: further, the suckers are aligned in transversal rows R (three suckers for each line).

In its spatial movement, the head 5 keeps the lines $F_1$-$F_3$ constantly orientated parallel to the channels 10, 20, 30, and therefore also with the line 40.

C denotes a centre of the head 5, and $E_1$, $E_2$ denote two possible extreme positions thereof, respectively upstream and downstream of the relative operating interval E.

To pick up articles 3 from the channels 10, 20, 30, the head is positioned above them and aligns the relative lines $F_1$-$F_3$ with the underlying channels; this is carried out in phase relation with the "following" of the head in direction F, up to equalizing the relative velocity with the velocity of the channels, with the centering of the suckers 7 on the underlying articles, with the lowering of the head 5 so as to grip the corresponding articles 3 with the suckers (previously activated); lastly, the head is raised, obviously in synchrony with the following, with a consequent removal of the articles 3 from the seatings 2 of the channels.

At this point the three lines of articles (or groups of articles) engaged to the three lines $F_1$-$F_3$ of suckers are available to be unloaded into the compartments of the line 40: the consecutive steps, as described above, are schematically represented by the drawing of the pathway $P_1$, (see the accompanying drawing figures).

Obviously the row R at the head (the most downstream row) of the operating head 5 exhibits the first segment S of the channels bearing articles.

With the disclosed method, an article or a stack of articles can be inserted in any compartment; it is clear from the foregoing that the insertion involves a series of compartments which is equal to the number of aspirating suckers 7 provided in each of the lines; in the considered example the series is constituted by eight consecutive compartments.

Three operating modes will be examined in the following, by way of example, with reference to FIGS. 2-12, relating to the filling of a series of compartments with three articles, two articles and one article.

In the accompanying figures, first the most external line $F_1$ of the three lines $F_1$-$F_3$ of the operating head is unloaded.

It should be understood that it is possible to unload the internal line $F_3$ first; the choice of first unloading the central line $F_2$ has no technical-functional complications, but it not advisable as it would be to the detriment of productivity, as will emerge from the following.

Figure 2:
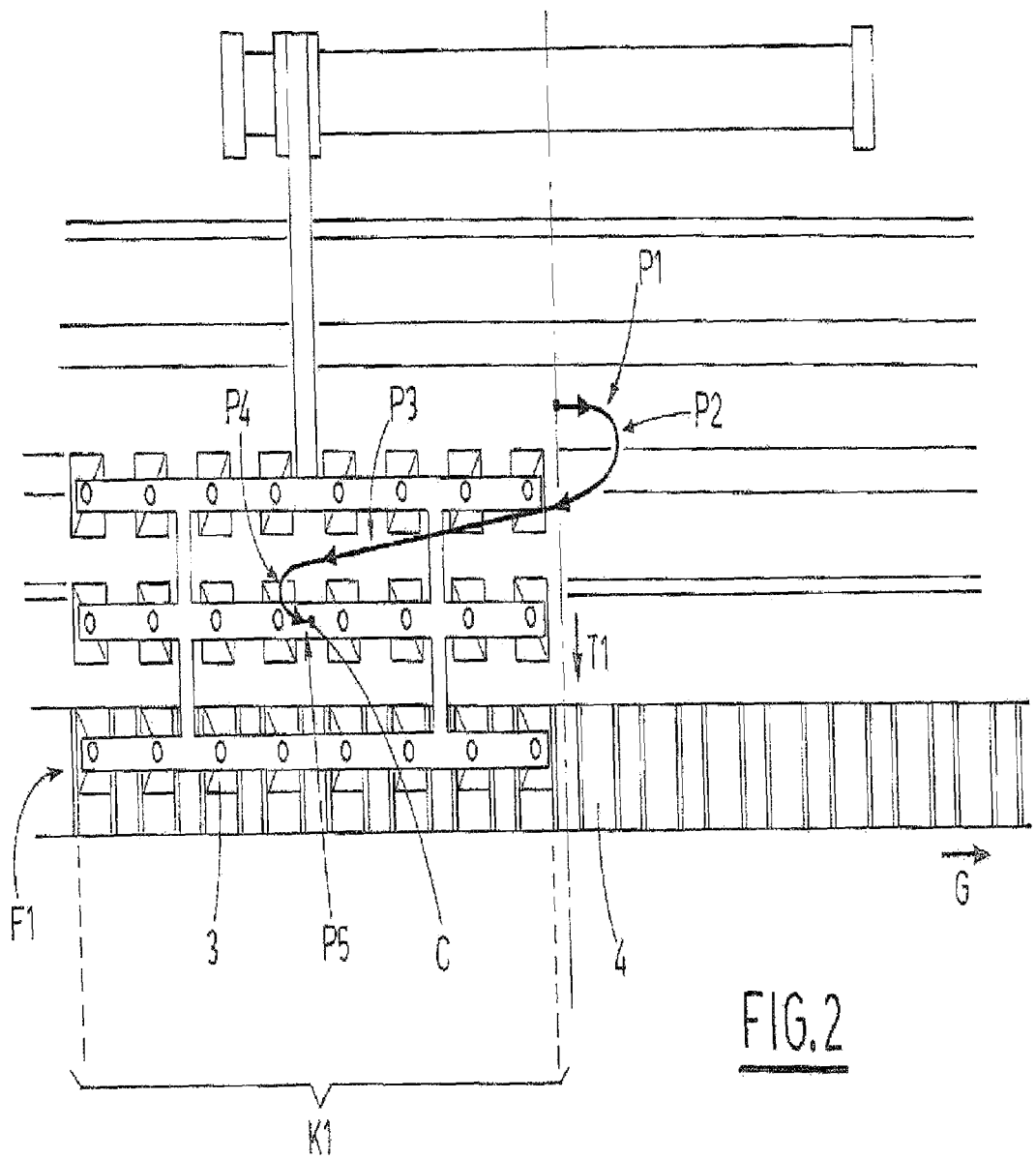
FIGS. 2-12 schematically illustrate some technical-functional aspects of the method, with reference to three channels for the supply of articles.

With reference to FIG. 2, the centre C of the operating head after the tract of pathway $P_1$ (already considered) inverts its movement (tract of pathway $P_2$) and follows a tract (tract of pathway $P_3$) in which the head retracts, i.e. displaces in the opposite direction to the translation direction G of the line 40 and contemporaneously translates in direction $T_1$ so as to near the relative external line $F_1$ to the line 40.

There follows a tract (tract of pathway $P_4$) in which the head 5 inverts its motion and gradually becomes arranged above the line 40; then there is a "following" contemporaneous to the centering of the articles 3 borne by the suckers 7 of the first line $F_1$ on the underlying compartments 4.

The definition of the latter steps, i.e. the equality of the velocity of the head 5 with respect to the velocity of the line 40 and the centering of the articles 3 borne by the suckers 7 of the first line with respect to the underlying compartments, enables the head 5 to lower and the suckers 7 of the first line $F_1$ to deactivate with a consequent unloading of the articles into the compartments: the latter steps are summarized by the tract of pathway $P_5$.

The above ends with a placing of an article in the compartments 4 of a first series $K_1$ of compartments.

Figure 3:
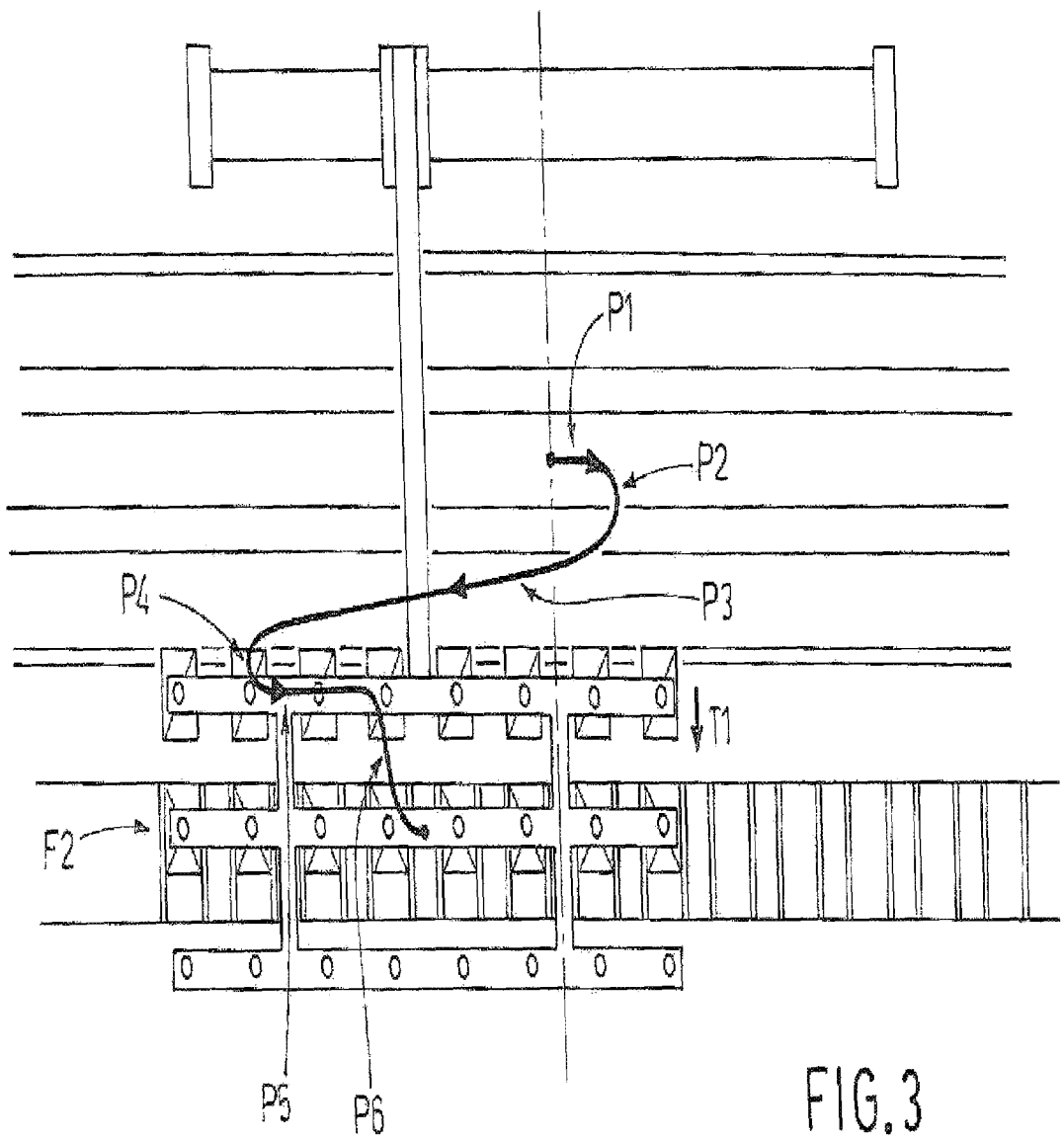

The inserting of a second article into the compartments of the first series $K_1$ involves the raising of the head 5 at the same time as the "following" (i.e. with the head 5 which translates at a same velocity as the line 40), the lateral translation in the direction $T_1$ with a value equal to the transversal pitch P, the positioning and the centering of the second line $F_2$ above the line 40, such that the articles 3 hooked to the suckers 7 of the central line $F_2$ are centered with respect to the underlying compartments 4 of the first series $K_1$ of compartments, the lowering of the head 5 in order to unload the articles into the compartments of the first series $K_1$ of compartments: the steps relating to the insertion of a second article into the compartments of the first series $K_1$ are summarized by the tract of pathway $P_6$ of FIG. 3.

Figure 4:
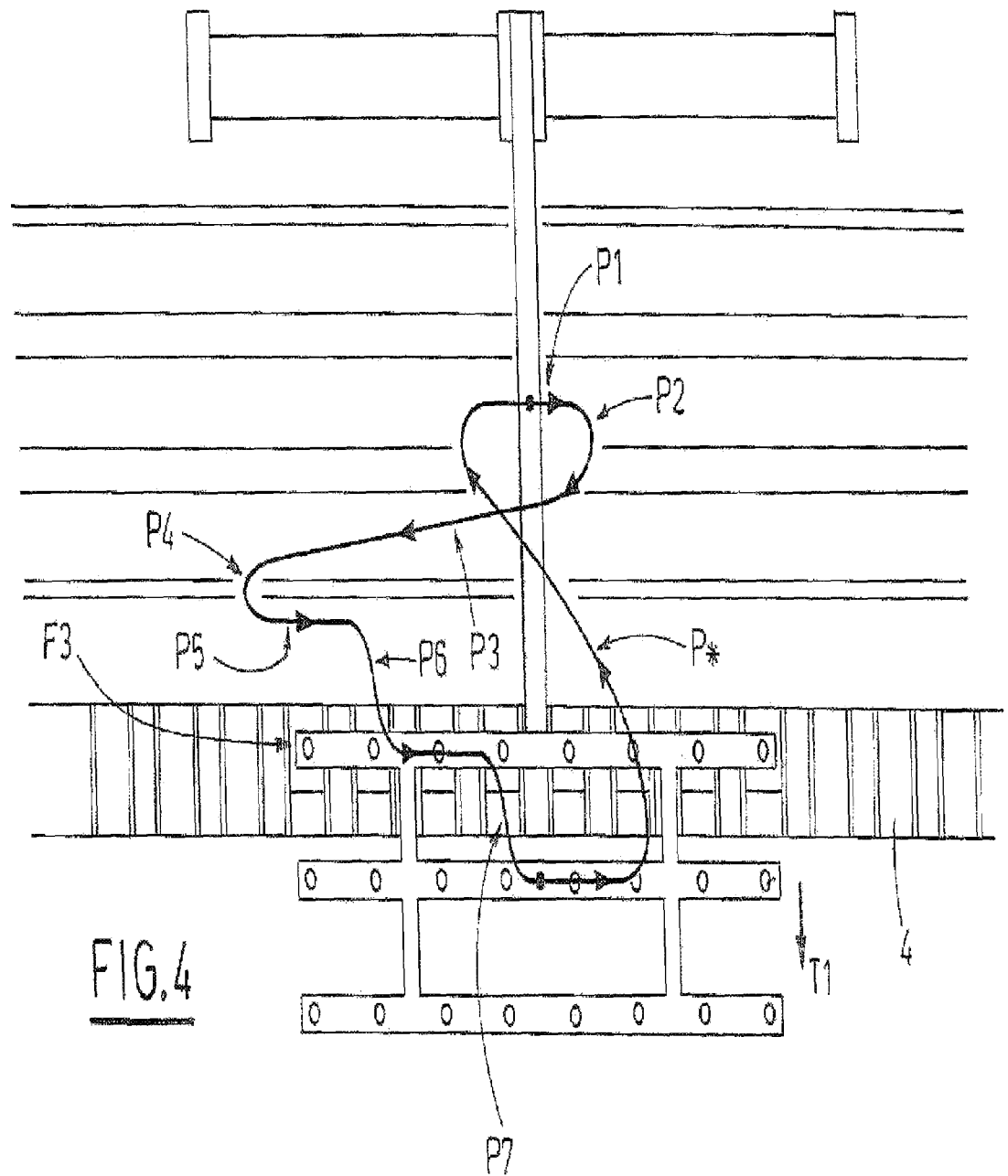
Figure 5:
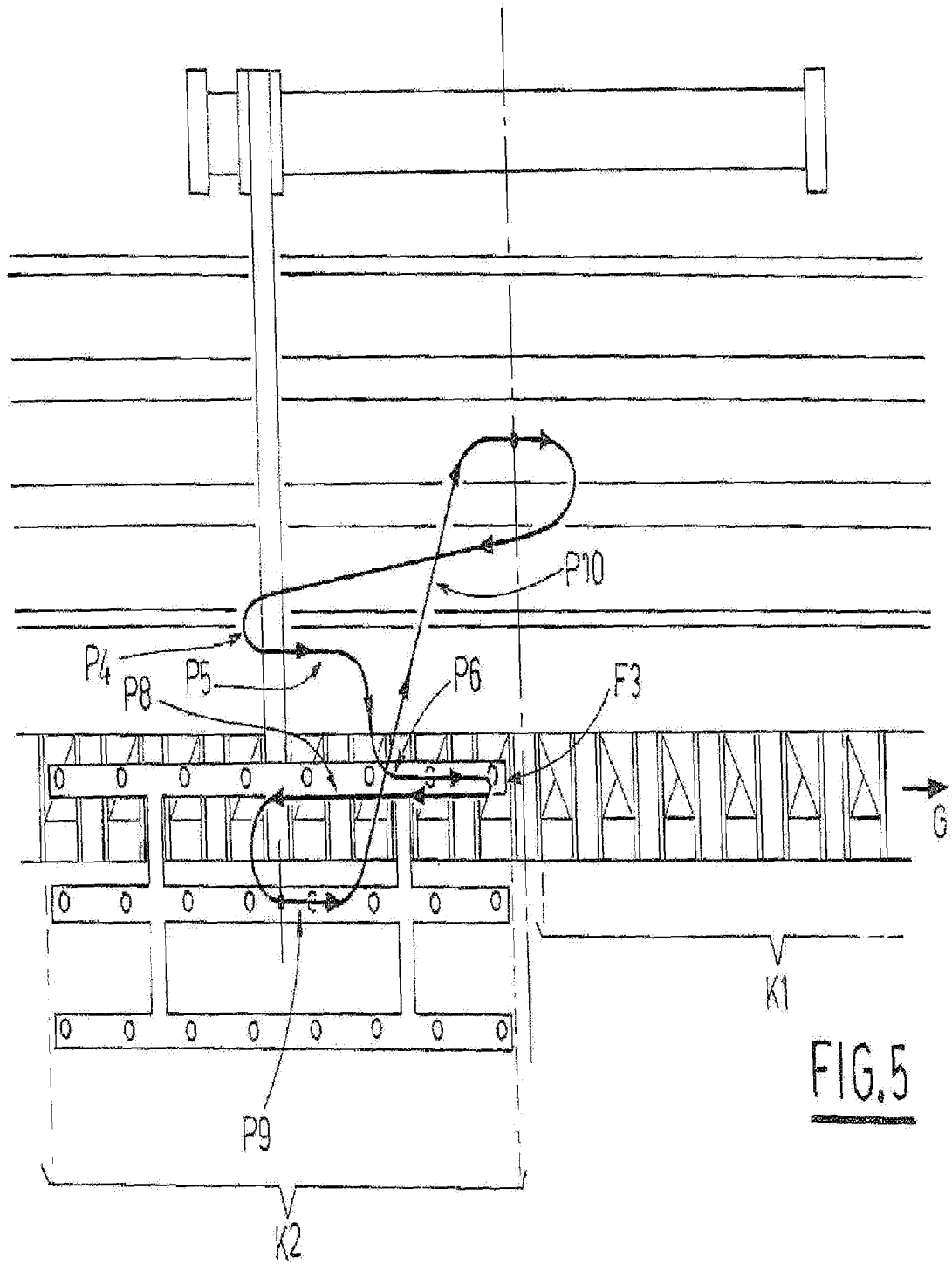
Figure 6:
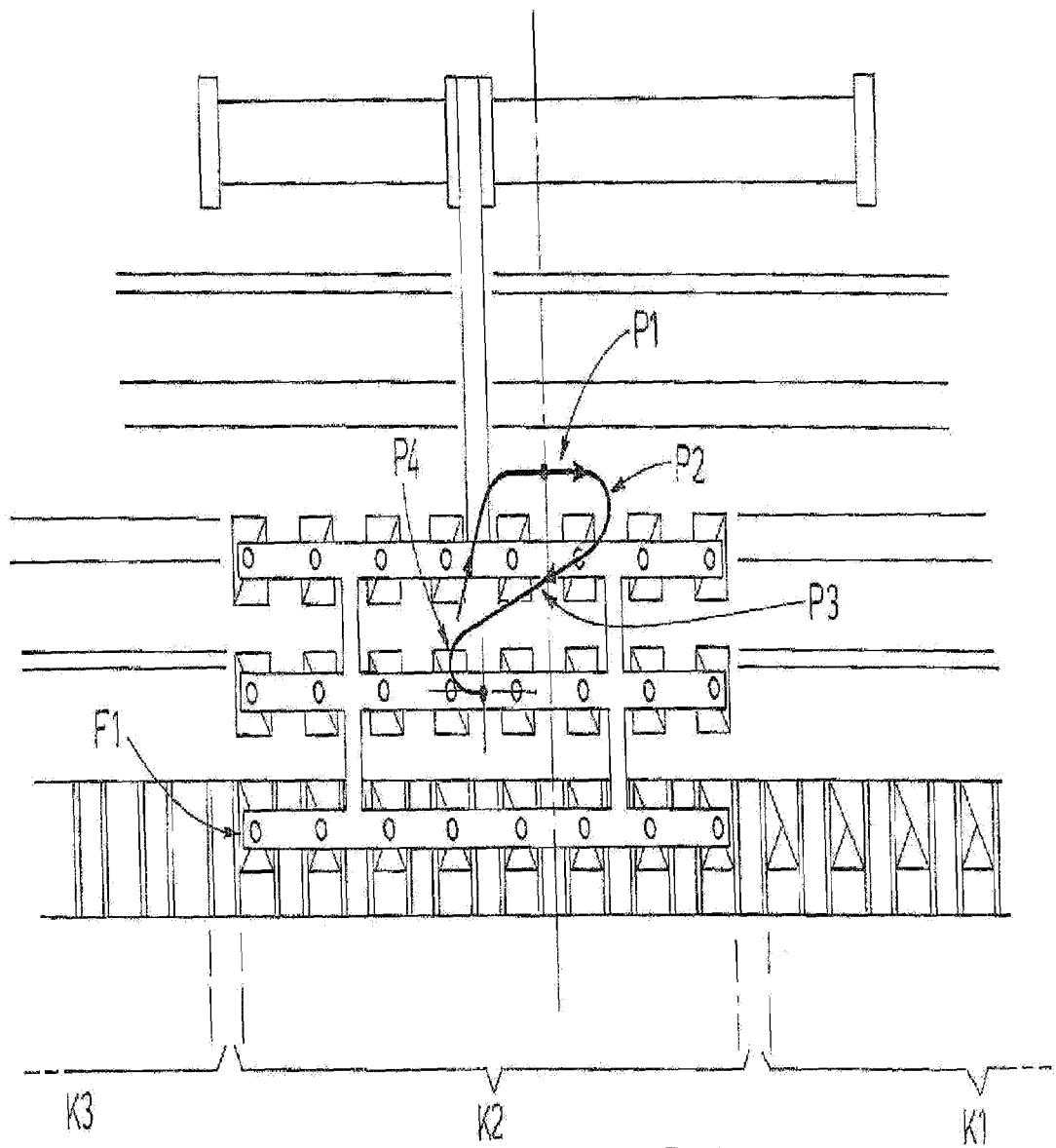

The placing of a third article in the compartments of the first series of compartments $K_1$ involves the operating head 5 in a succession of similar steps to the tract of pathway $P_6$, with reference to the internal line $F_3$ and the compartments 4 of the first series $K_1$; the head 5 displaces in direction $T_1$ by an amount equal to the transversal pitch P, and the operation is completed with the unloading into the compartments of the articles hooked to the internal line $F_3$: the succession of the final steps is identified by the tract of pathway $P_7$ (see FIG. 4).

When the articles of the internal line $F_3$ have been unloaded (with a completion of the filling of the compartments of the first series $K_1$), the head 5 is raised to bring it onto the channels 10, 20, 30 (pathway P* of FIG. 4) where, in respect of the steps of the tract of pathway $P_1$, the head 5 hooks, to the relative suckers, groups of articles simultaneously picked up by the channels, in the considered example a group of eight articles for each channel.

In a case in which two articles 3 are to be placed in each compartment 4 of a first series $K_1$ of compartments, in the situation illustrated in FIG. 3, the filling of the first series is completed.

The head 5 still bears the articles, and more precisely the articles hooked to the internal line $F_1$.

At the end of the tract of pathway $P_6$, i.e. on completion of the filling of the first series of compartments $K_1$ (two articles 3 for each compartment 4), the operating head inverts the motion, retreating (tract of pathway $P_8$ of FIG. 5) with a contextual translation in the direction $T_1$ by an amount equal to the transversal pitch P in such a way as to arrange the internal line $F_3$ above the line 40; the articles hooked to the suckers 7 of the internal line $F_3$ are then centered on the underlying compartments 4 of a second series $K_2$ of the compartments consecutive to the first series $K_1$; the centering is actuated in the synchrony with the "following" of the head 5 with respect to the line 40. The head is then lowered, the articles in the internal line $F_3$ are unloaded on the underlying compartments of the second series; these steps are summarized in the tract of pathway $P_9$ of FIG. 5.

The operating head at this point is without articles, and following its raising is returned into the original position (tract of pathway $P_{10}$) above the channels 10, 20, 30.

The operating head is re-loaded with the steps of the tract of pathway $P_1$; in the following steps defined by the tracts of pathway $P_2$, $P_3$, $P_4$ (see FIG. 2) are performed; it follows that via the external line $F_1$ articles are unloaded onto the underlying compartments 4 of the second series $K_2$ (see FIG. 6) which is thus completed, as two articles are present in each compartment 4 of the series.

Figure 7:
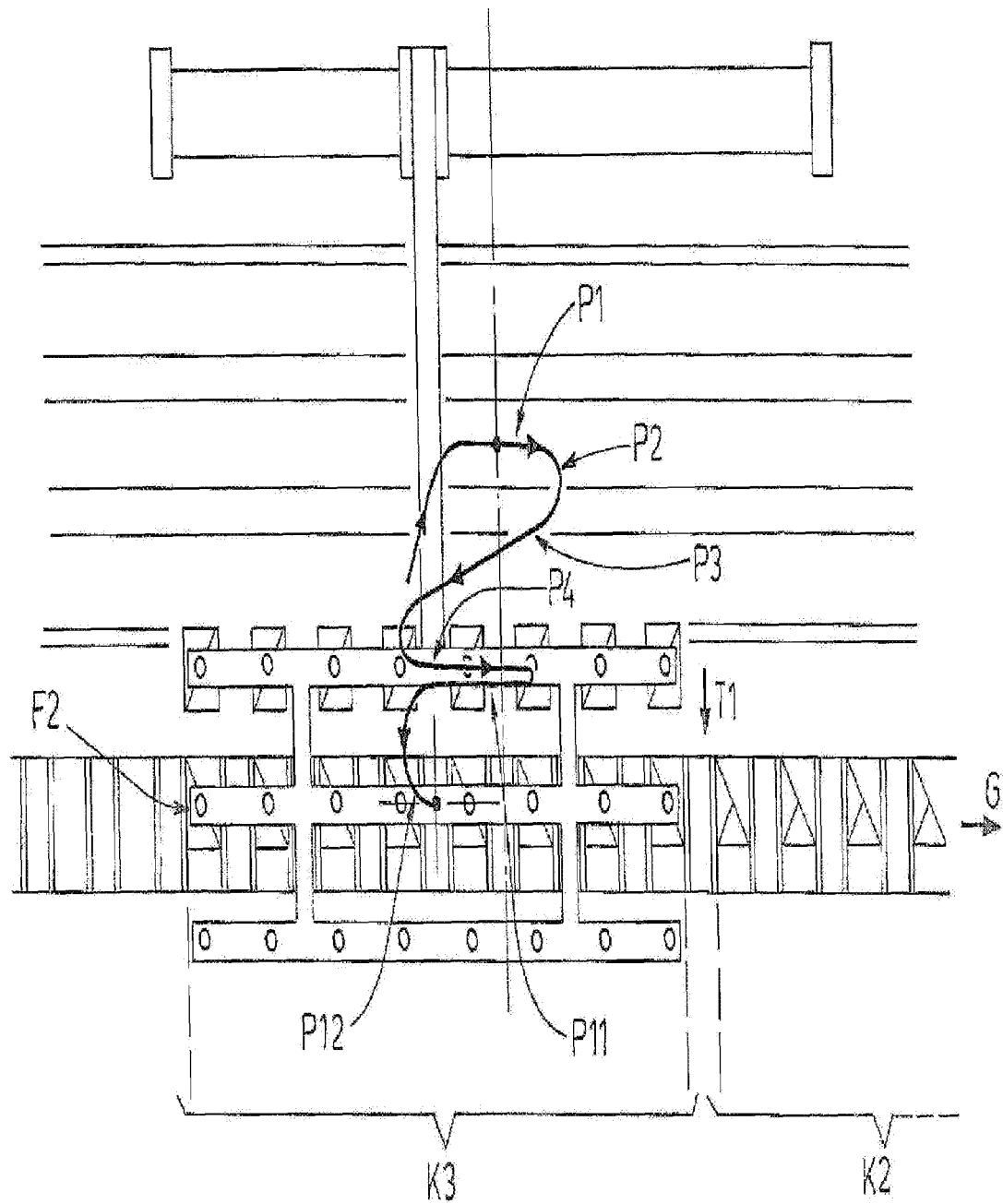
Figure 8:
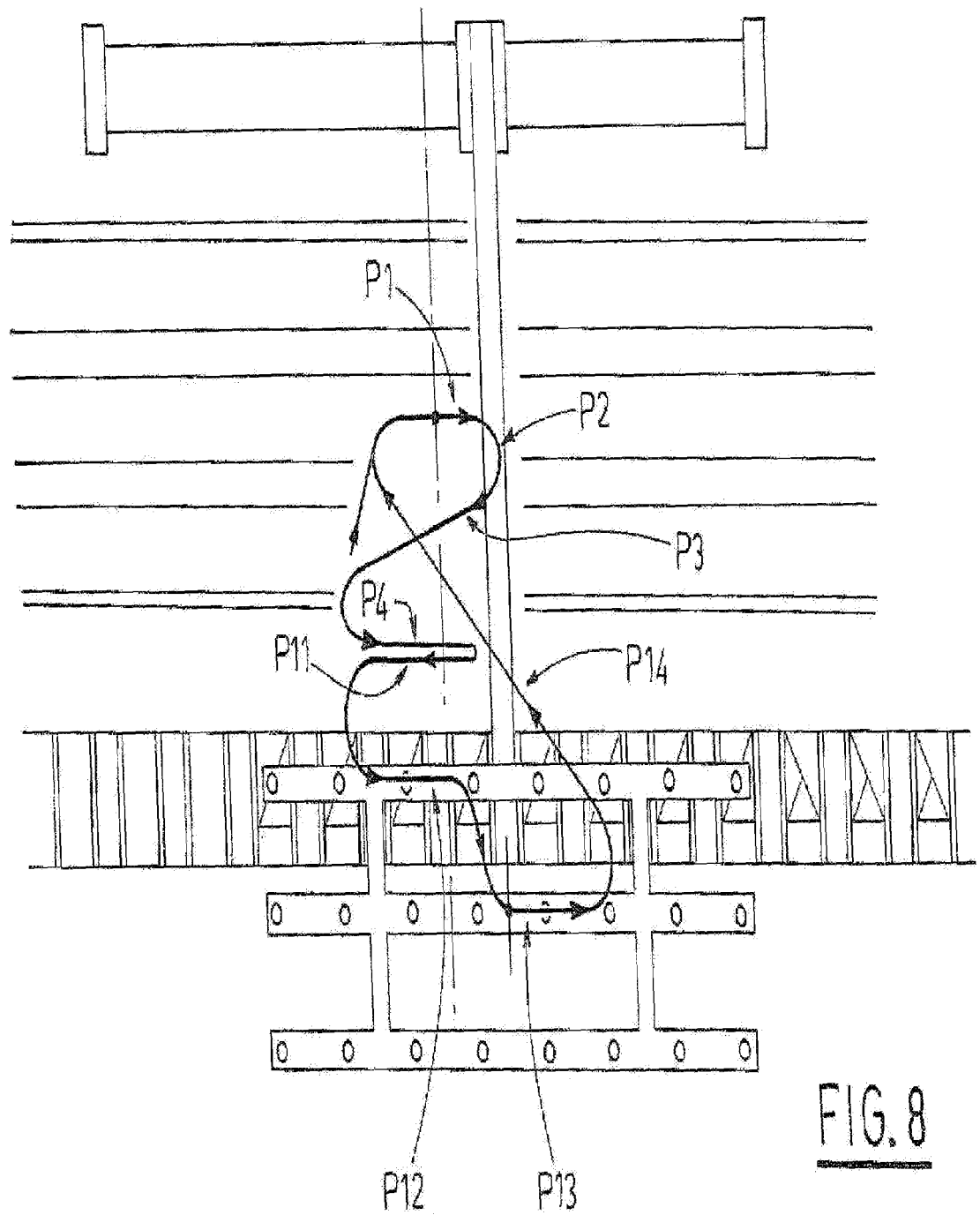

When the filing of the second series $K_2$ has been completed, the operating head 5 inverts the motion (tract of pathway $P_{11}$ of FIG. 7), and translates also in the direction $T_1$ so as to arrange the relative central line F2 above the line 40; there follows the centering of the articles 3 of the central line F2 above the underlying compartments 4 of a third series K3 of compartments, consecutive to the preceding second series $K_2$, the "following" of the head with respect to the line 40 and the lowering thereof in order to perform the unloading of the articles of the central line $F_2$ on the underlying compartments (tract of pathway $P_{12}$ of FIG. 7).

When the unloading has been completed, the head is raised, it translates along direction $T_1$, positions the internal line $F_3$ above the line 40, all in a like way to what has already been described with the aim of unloading the articles of the internal line on the compartments 4 of the third series $K_3$ of compartments (tract of pathway $P_{13}$ of FIG. 8): thus the filling operation of the compartments of the third series $K_3$ is completed.

The head 5 unloads the articles, raises and returns above the channels (tract of pathway $P_{14}$ of FIG. 8) in order to start a new elementary cycle alike to the one described herein above.

Figure 9:
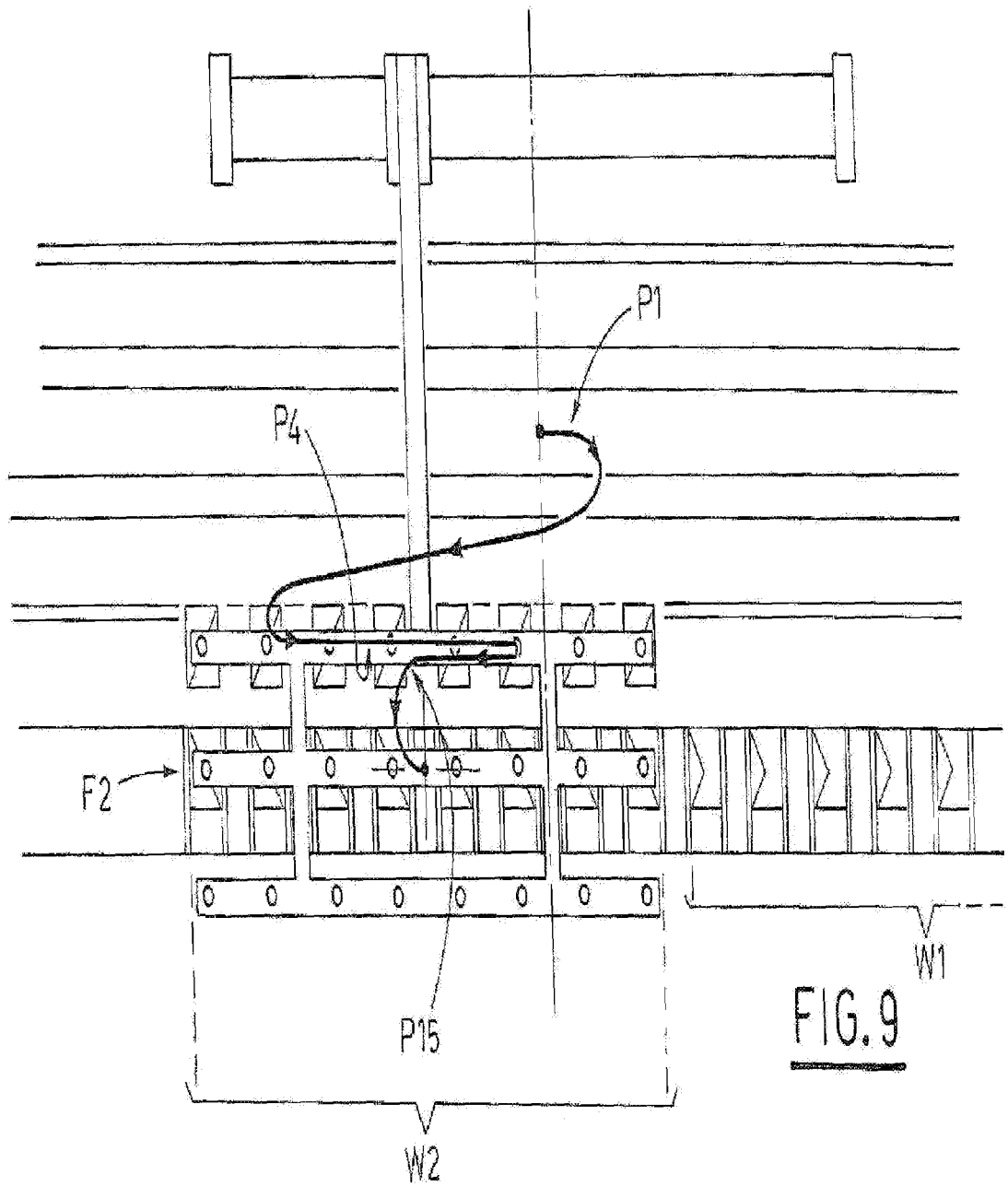
Figure 10:
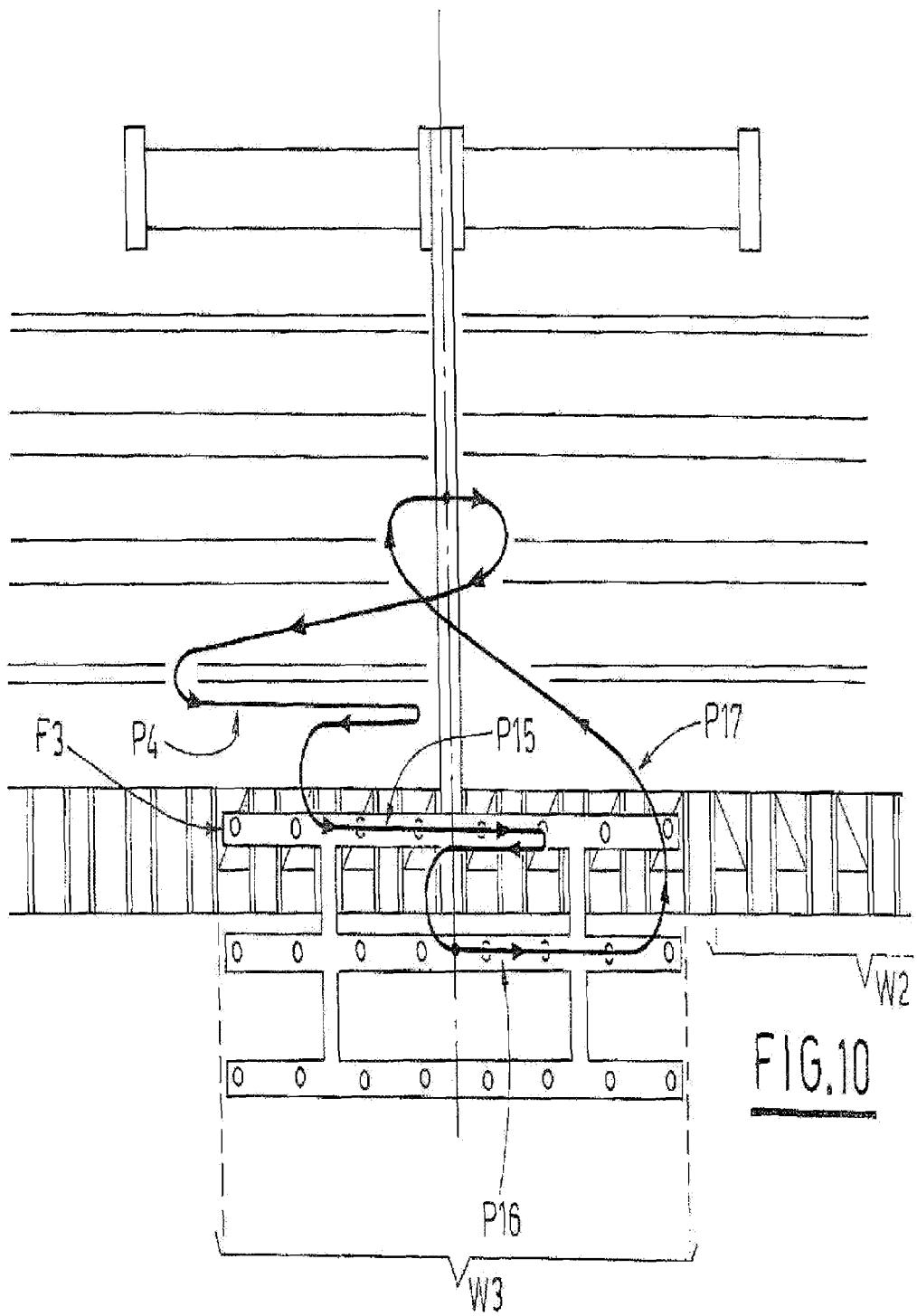

The insertion of a single article in the compartments 4 is clear from observing FIGS. 2, 9, 10.

In accordance with the steps defined by the tracts of pathway $P_1$-$P_4$ (FIG. 2), the operating head 5 positions the relative external line $F_1$ centered on the underlying compartments of a first series $W_1$ of compartments: a corresponding article is inserted into the compartments 4 to complete the series.

When the first series $W_1$ of compartments is completed, the head is raised, the motion reversed (i.e. it translates in an opposite direction to direction G), contemporaneously translating also in direction $T_1$ such as to position the central line $F_2$ on the line 40 (tract of pathway $P_{15}$, FIG. 9): then the articles of this line $F_2$ are centered on the compartments of a second series $W_2$ of compartments, consecutive to the preceding first series $W_1$, the centering being actuated in phase with the "following" of the head 5 with respect to the line, with a zeroing of the relative velocity between the line and the head 5.

The lowering of the head, realized in phase relation with the deactivation of the suckers of the central line $F_2$, enables the articles of this line to be unloaded into the underlying compartments of the second series $W_2$ of compartments which is thus completed.

With a tract of pathway $P_{16}$ (FIG. 10) similar to the tract of pathway $P_{15}$, the articles relating to the internal line $F_3$ of the head 5 are unloaded into the compartments 4 of a third series $W_3$ of compartments consecutive to the preceding second series $W_2$.

After completion of the third series $W_3$ of compartments the head 5 is raised and returned (tract of pathway $P_{17}$, FIG. 10) above the channels 10, 20, 30 in order to start a new elementary cycle.

The definition of the first, second and third series $W_1$, $W_2$, $W_3$ of compartments 4 (FIGS. 2, 9, 10) initially led to the tract of pathway $P_3$ (FIG. 2) during which the head 5 was initially positioned in proximity of the extreme position $E_1$, the upstream position with reference to the direction G of translation of the line 40.

The filling of the compartments 4 of the series of compartments $W_1$, $W_2$, $W_3$ (one article per compartment) can be actuated by initially positioning the head 5 in proximity of the remaining extreme position $E_2$, the position downstream of the direction G.

Figure 11:
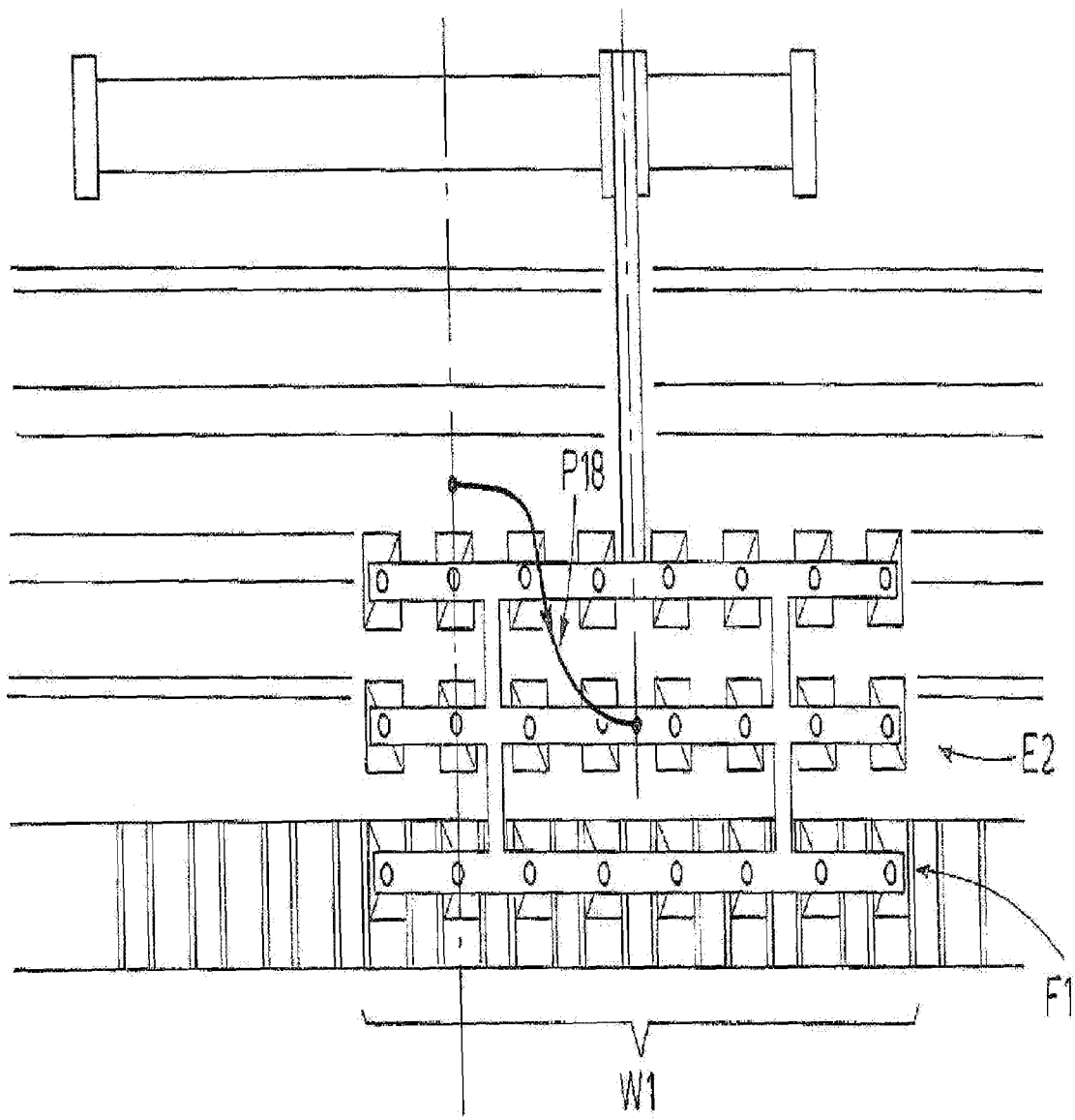

This is illustrated in FIG. 11 (tract of pathway $P_{18}$) which illustrates the situation with which, by means of the external line, the filling of the compartments 4 is performed relative to the first series $W_1$ of compartments (only one article per compartment).

Figure 12:
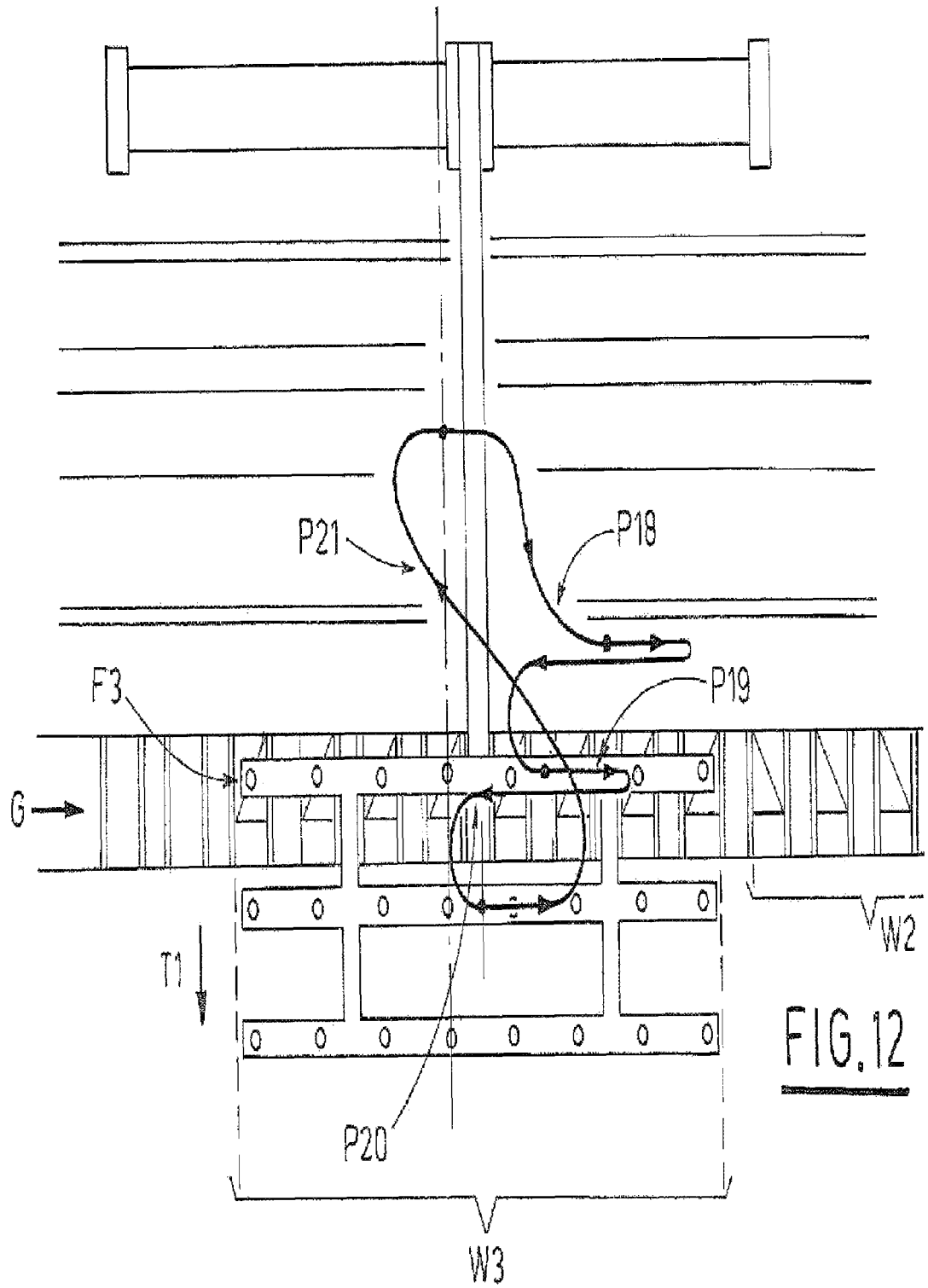

When the compartments of the first series $W_1$ have been filled, the head 5 retracts, also displacing in direction $T_1$ (displacement equal to the transversal pitch P), in such a way as to complete the filling of the second series $W_2$ of compartments with the articles 3 borne by the central line $F_2$ (pathway $P_{19}$, FIG. 12).

FIG. 12 illustrates the internal line $F_3$ centered on the compartments of the third series $W_3$ of compartments; this is actuated with elementary steps, already considered, contained in the tract of pathway $P_{20}$ consecutive to the preceding tract of pathway $P_{19}$ with respect to which it develops in a similar way.

When the filling of the compartments of the third series $W_3$ has been completed, the head is raised so as to return (tract of pathway $P_{21}$) on the channels 10, 20, 30: thus a new elementary cycle begins.

In the examples of FIGS. 2-10, at the start of an elementary cycle the operating head is positioned in proximity to or at the extreme position $E_1$ (upstream); this invokes the tract of pathway $P_3$ (opposite translation direction G of the line 40) and the following inversion of motion with the consequent "following" of the line 40 by the head.

In the examples of FIGS. 11, 12, at the start of the elementary cycle the operating head is positioned in proximity to the remaining extreme position $E_2$ (downstream): see the tract of pathway $P_{18}$ (same direction as translation direction G of the line).

In the first situation examined, if on the one hand the reaching by the head 5 of a position close to that of the series of compartments is facilitated by the fact that the head retreats (tract $P_3$), on the other hand the motion (tract $P_4$) has to be inverted and subsequently the "following".

In the second examined situation the head 5 (pathway $P_{18}$) "follows" the line 40, without inversion of the direction as in the first situation.

This last situation is advantageous when the number of articles to be inserted in the compartments is one or a little above, i.e. a number comprised between the lower numbers of the range of articles which it is possible to insert in each compartment with the present method.

This is obvious as by increasing the number of articles to be inserted in each compartment, the operating interval E of the head has to be optimally used, which means that it has to be positioned, at the start of the operating cycle, at extreme position $E_1$.

In the examples considered, the unloading of the articles of the head 5 was actuated proceeding from the external line $F_1$ following the central line $F_2$ and finally the internal line $F_3$: in this way it is sufficient to displace the head by one tract, equal to the transversal pitch P, in direction $T_1$ in order to position a further line above the compartments 4 of the line 40.

Unloading can be performed starting from the internal line $F_3$, the continuing with the central line $F_2$ and finally the external line $F_1$: it is sufficient to translate the head transversally in direction $T_2$, opposite $T_1$, by amounts equal to the transversal pitch P.

It is not appropriate to start unloading starting from the central line $F_2$, as if the unloading of the second line (internal $T_3$ or external $F_1$) includes translation of the head 5 in directions $T_1$ or $T_2$ by an amount which is equal to the transversal pitch, for unloading the final line the head has to be transversally displaced by a tract equal to double the transversal pitch.

Figure 13:
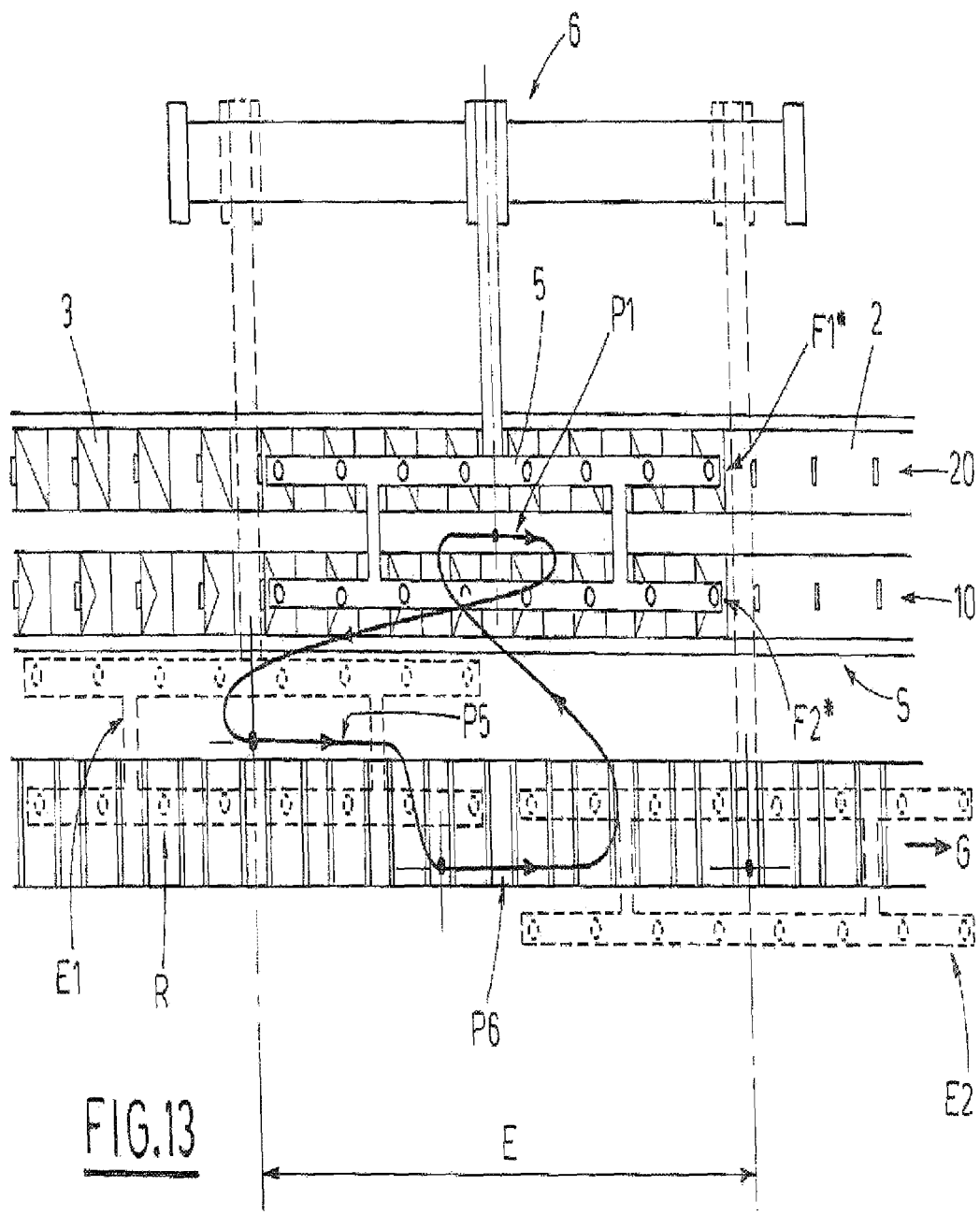
FIGS. 13-15 schematically illustrate further technical-functional aspects of the proposed methods, with reference to two channels for the supply of articles.

In FIG. 13, in place of three channels only two channels 10, are provided; correspondingly the operating head only comprises two lines $F_1^*$, $F_2^*$, respectively external and internal.

By way of illustration, the same reference numerals as in the preceding figures are used.

For example, the inserting of two articles in the compartments of a series $H_1$ of compartments of the line 40 involves the head 5 performing the tracts of pathway $P_1$, $P_2$, $P_3$, $P_4$, $P_5$ already examined with reference to FIG. 2 (see also FIG. 14); this enables the operating head to unload the articles of the external line $F_1^*$ on the underlying compartments 4 of the series $H_1$ of compartments.

Figure 14:
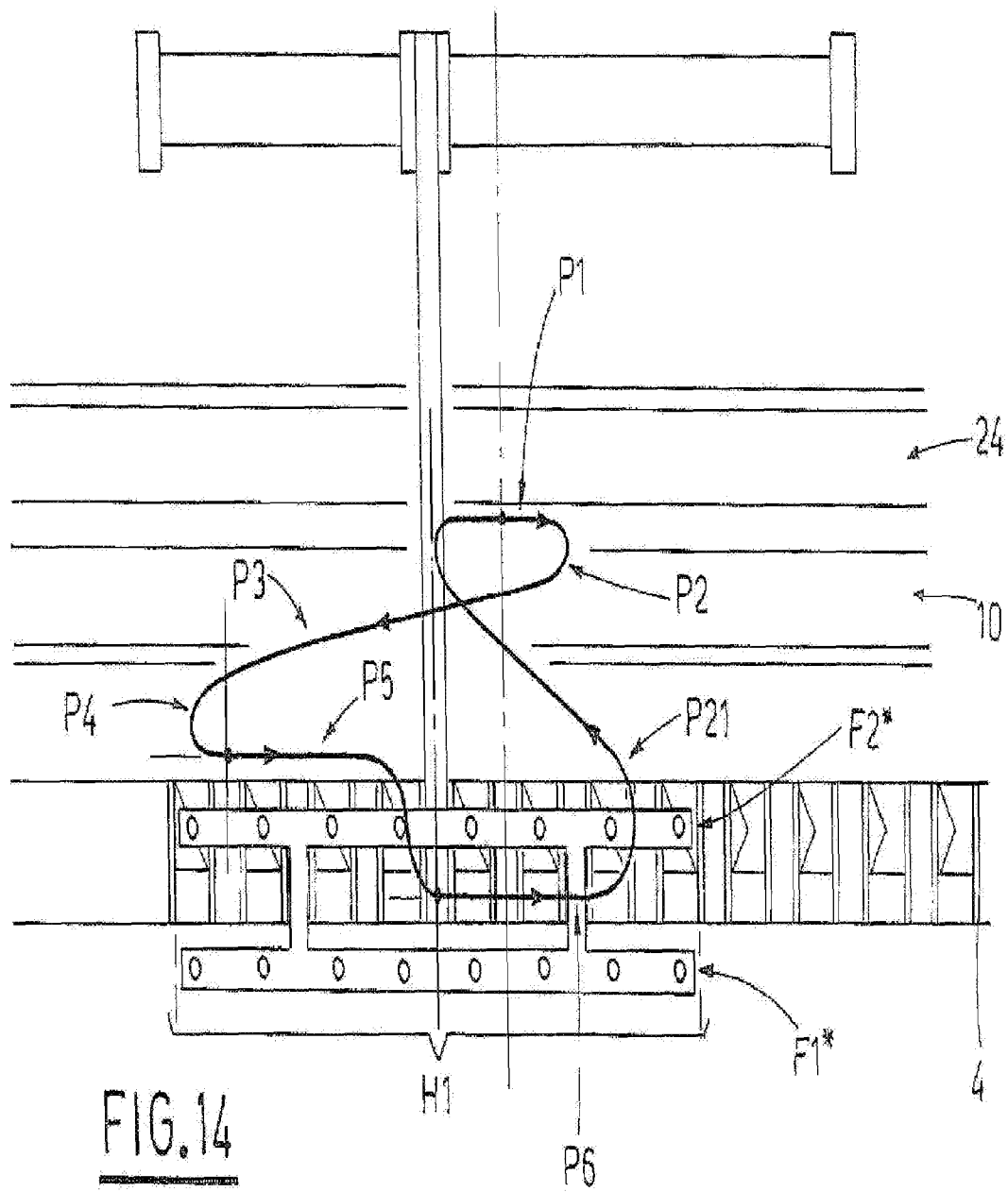

The inserting of the second article 3 in each compartment 4, resting on the precedingly placed article, involves the head 5 travelling the same tract of pathway $P_6$ as in FIG. 3 and repeated in FIG. 14; in this way the internal line $F_2^*$ of the head 5 unloads the relative articles in the underlying compartments.

At this point the head 5 is unloaded, and thus is raised in order to be repositioned on the channels 10, 20 with the aim of initiating a new elementary cycle (tract of pathway $P_{21}$).

The inserting of an article in each compartment leads, in an elementary cycle of the head 5, to filling the compartments of two consecutive series of compartments, in accordance, for example, with the tracts of pathway $P_1$-$P_4$, $P_{15}$ as in FIGS. 9, 10, or with the tracks of pathway $P_{18}$, $P_{19}$ as in FIGS. 11, 12; after having completed two series of compartments, the operating head is returned above the channels 10, 20.

Figure 15:
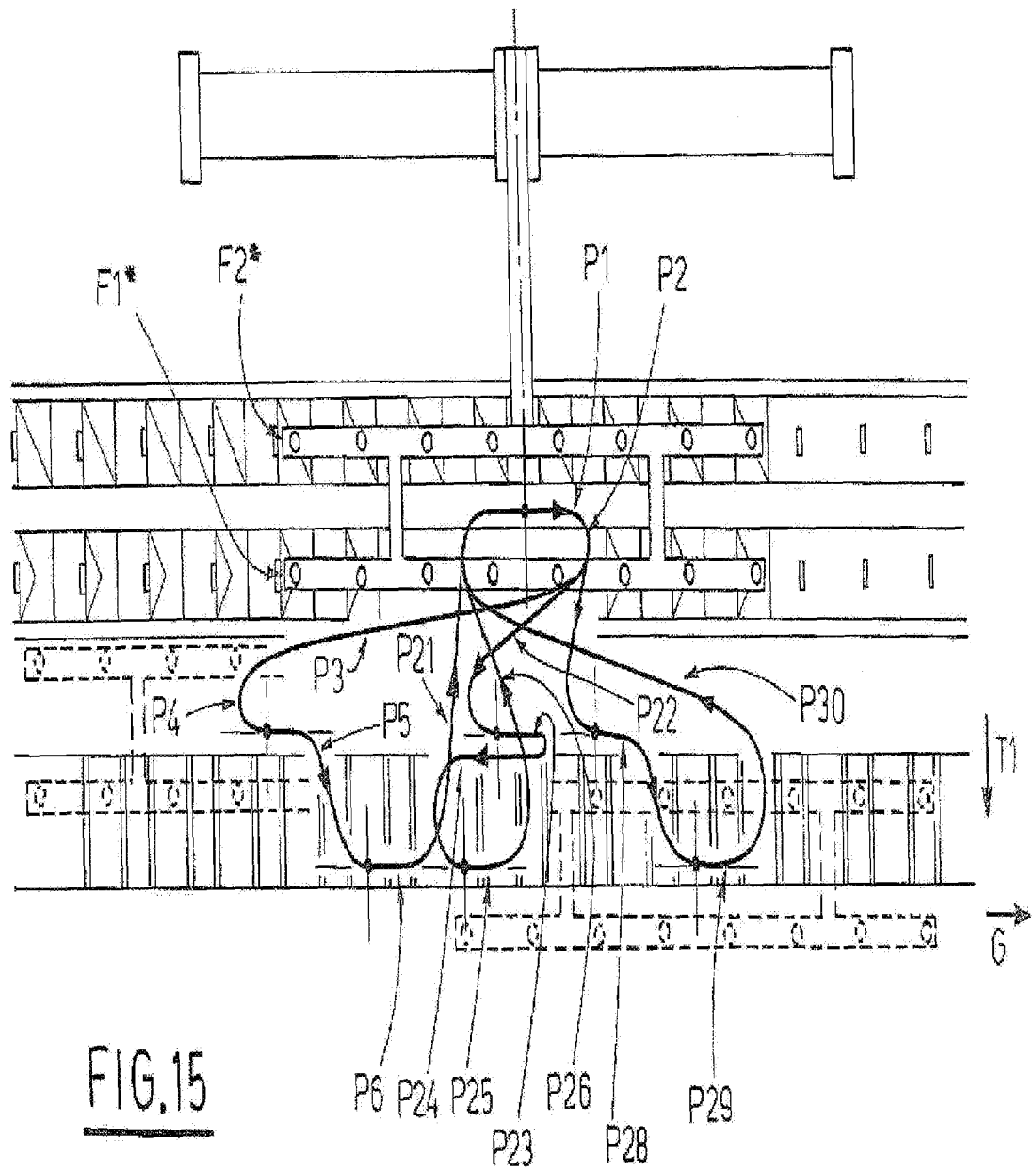

By proceeding according to the technical-functional teachings already considered in the preceding figures, FIG. 15 illustrates the tracts of pathways identified by the succession of elementary steps imposed on the head 5 in order to insert three articles in each compartment, starting from only two channels 10, 20 and with the head provided with the two lines $F_1^*$, $F_2^*$.

By means of the tracts of pathways $P_1$-$P_6$, $P_{21}$ (see also FIG. 14), two articles are inserted in a first series of compartments 4, which is obtained with a complete run of the head 5.

Via the succession of steps summarized by tracts $P_1$, $P_{22}$, $P_{23}$, (FIG. 15), the head 5 positions the external line $F_1^*$ centered above the compartments of the first series of compartments; with the deactivation of the suckers 7 of the last line, a further article is inserted into the above-mentioned compartments 4, resting on the previously-inserted stack of two articles: the filling of the first series of compartments is thus completed.

At this point the head 5 is raised and retreats, translating also transversally in direction $T_1$, (for a tract which is equal to the transversal pitch P), in order to invert the motion up to when it is the same as direction G of the line 40 and finally follows the line 40 so as to centre the internal line $F_2^*$ on the compartments 4 of a second series of compartments consecutive to the first series of compartments; the unloading of the articles from the suckers 7 of the line $F_2^*$ enables an article to be inserted in the compartments of the second series: the steps set out above are represented by the tracts of pathway $P_{24}$, $P_{25}$.

The operating head 5, free of articles, is returned to above the channels 10, 20 (tract of pathway $P_{26}$) such that with the steps included in tract $P_1$, sixteen articles (in the illustrated example) can be picked up, eight per line.

Via the tract of pathway $P_{28}$, the articles of the external line $F_1{}^*$ are unloaded on the underlying compartments of the second series of compartments, and lastly via the tract of pathway $P_{29}$ the articles 3 of the internal line $F_2{}^*$ are unloaded on these compartments.

The filling of the compartments of the second series of compartments is thus completed (three articles in each compartment).

The operating head is raised such as to newly return onto the channels 10, 20 (tract of pathway $P_{30}$).

In the considered examples relating to three channels 10, 20, 30, with the operating head on three lines $F_1$, $F_2$, $F_3$, and two channels 10, 20 with the operating head on two lines $F_1{}^*$, $F_2{}^*$, the number of articles inserted in each compartment was:

equal to the number of channels (example: three articles starting from three channels, two articles starting from two channels);

lower than the number of channels (example: one or two articles starting from three channels, one article starting from two channels);

greater than the number of channels (example: three articles starting from two channels).

With the proposed method, starting from any number of channels (at least two channels) a predetermined number of articles can be inserted in the compartments 4 of a series of compartments of the line 40.

It is further possible to exchange the position of the supply line 40 with the position of the channels 10, 20 and 30 (FIGS. 2-12), or the channels 10, 20 (FIGS. 13-15) without the method being subjected to variations in its technical-functional aspects.

In the illustrated example the lines $F_1$, $F_2$, $F_3$, $F_1{}^*$, $F_2{}^*$ of the operating head can comprise a number of suckers that is greater than or less than those of the considered examples.

The above is illustrated by way of example; any eventual technical-functional variants of the steps considered are understood to fall within the ambit of protection of the disclosed method.

The invention claimed is:

1. A method for transferring articles picked up from several channels for delivery to a supply line of a packing machine comprising:

continuously and synchronously moving the channels in a moving direction, the channels being mutually distanced transversally according to a transversal pitch, and having seatings for containing articles, the seatings being equidistanced from each other and having a longitudinal pitch and being transversally aligned;

continuously moving the supply line in a moving direction parallel to the channels moving direction, the supply line having receiving compartments, each receiving compartment being capable of receiving one article or a stack of articles, the receiving compartments being equidistanced from each other and having a longitudinal pitch equal to the equidistance and longitudinal pitch of the seatings of the channels;

providing an operating head having pick-up devices arranged in longitudinal lines, in a same number as a number of channels, the lines of the pick-up devices being mutually transversally distanced according to a transversal pitch equal to the channels transversal pitch, the pick-up devices of each line being equidistanced according to a longitudinal pitch equal to the longitudinal pitch by which the seatings of the channels are longitudinally equidistanced and being equal to the longitudinal pitch by which the supply line compartments are longitudinally equidistanced and being aligned transversally with the pick-up devices of the remaining lines, spatially moving the operating head along three Cartesian axes while keeping the lines of the pick-up devices constantly parallel to the channels and to the supply line, and, inserting in each compartment of the supply line a stack of articles with a number of the stacked articles being equal to a number of the channels, by performing the following steps:

a1—positioning the operating head above the channels, aligning the lines of the pick-up devices with the channels, moving the operating head along the channels moving direction to follow the channels so as to have a zero relative velocity between the operating head and the channels, the pick-up devices centering on the seatings containing the articles and, while maintaining the operating head in a following-mode, following the channels with a zero relative speed, lowering the operating head and using the pick-up devices for picking up an equally-numbered line of articles from each of the channels, raising the operating head to remove the articles from the relative channel seatings;

a2—displacing the operating head to a position above the supply line and positioning a first line of pick-up devices above a first series of compartments of the supply line, the series being equal to the number of the pick-up devices, and, moving the operating head along the moving direction of the supply line to follow the supply line, to have a contemporaneous zero relative velocity between the operating head and the supply line, the pick-up devices centering with said first series of compartments;

a3—lowering the operating head and deactivating the pick-up devices positioned above the compartments of said first series of compartments, disengaging the articles from the pick-up devices with a consequent insertion of the articles in the underlying first series of compartments of the supply line;

a4—raising the operating head and, by maintaining the operating head in the following-mode with zero-relative speed between the head and the supply line, transversally displacing the operating head with respect to the supply line according to a transversal pitch equal to the transversal pitch by which the lines of pick-up devices are equally distanced and equal to the transversal pitch by which the channels are transversally distanced, so as to position a further line of pick-up devices above the first series of compartments and to center the further pick-up devices with said first series of compartments;

a5—lowering the operating head and deactivating the further pick-up devices, disengaging the relative articles and inserting the articles in the underlying first series of compartments above and on top of the corresponding articles previously inserted in the compartments;

a6—repeating steps a4 and a5, until all the remaining lines of pick-up devices of the operating head have disengaged their articles, with a consequent completion of the filling of each compartment of the first series of compartments with a stack of articles, the number of stacked articles being equal to the number of the channels;

a7—raising and returning the operating head to above the channels for repeating the steps a1, a2, a3, a4, a5 and a6.

2. A method for transferring articles picked up from several channels for delivery to a supply line of a packing machine comprising:

- continuously and synchronously moving the channels in a moving direction, the channels being mutually distanced transversally according to a transversal pitch, and having seatings for containing articles, the seatings being equidistanced from each other and having a longitudinal pitch and being transversally aligned;
- continuously moving the supply line in a moving direction parallel to the channels moving direction, the supply line having receiving compartments, each receiving compartment being capable of receiving one article or a stack of articles, the receiving compartments being equidistanced from each other and having a longitudinal pitch equal to the equidistance and longitudinal pitch of the seatings of the channels;
- providing an operating head having pick-up devices arranged in longitudinal lines, in a same number as a number of channels, the lines of the pick-up devices being mutually transversally distanced according to a transversal pitch equal to the channels transversal pitch, the pick-up devices of each line being equidistanced according to a longitudinal pitch equal to the longitudinal pitch by which the seatings of the channels are longitudinally equidistanced and being equal to the longitudinal pitch by which the supply line compartments are longitudinally equidistanced and being aligned transversally with the pick-up devices of the remaining lines,
- spatially moving the operating head along three Cartesian axes while keeping the lines of the pick-up devices constantly parallel to the channels and to the supply line, and, inserting in each compartment of the supply line a stack of articles greater than one but less than the number of the channels by performing the following steps:
- b1—positioning the operating head above the channels, aligning the lines of the pick-up devices with the channels, moving the operating head along the channels moving direction to follow the channels so as to have a zero relative velocity between the operating head and the channels, the pick-up devices centering on the seatings containing the articles and, while maintaining the operating head in a following-mode, following the channels with a zero relative speed, lowering the operating head and using the pick-up devices for picking up an equally-numbered line of articles from each of the channels, raising the operating head to remove the articles from the relative channel seatings;
- b2—displacing the operating head to a position above the supply line and positioning a first line of pick-up devices above a first series of compartments of the supply line, the series being equal to the number of the pick-up devices, and, moving the operating head along the moving direction of the supply line to follow the supply line, to have a contemporaneous zero relative velocity between the operating head and the supply line, the pick-up devices centering with said first series of compartments;
- b3—lowering the operating head and deactivating the pick-up devices positioned above the compartments of said first series of compartments, disengaging the articles from the pick-up devices with a consequent insertion of the articles in the underlying first series of compartments of the supply line;
- b4—raising the operating head and, by maintaining the operating head in the following-mode with zero-relative speed between the head and the supply line, transversally displacing the operating head with respect to the supply line according to a transversal pitch equal to the transversal pitch by which the lines of pick-up devices are equally distanced and equal to the transversal pitch by which the channels are transversally distanced, so as to position a further line of pick-up devices above the first series of compartments and to center the further pick-up devices with said first series of compartments;
- b5—lowering the operating head and deactivating the further pick-up devices, disengaging the relative articles and inserting the articles in the underlying first series of compartments above and on top of the corresponding articles previously inserted in the compartments;
- b6—repeating the steps b4 and b5, up to completion of insertion into each compartment of said first series of compartments of a stack of articles with a predetermined number of stacked articles which is less than the number of the channels;
- b7—raising and retracting the operating head by inverting the motion of the operating head with respect to the moving direction of the supply line, then moving the operating head in the supply live moving direction to follow the supply line with a zero-relative speed between the operating head and the supply line, and at the same time, while maintaining the operating head in the following-mode with zero-relative speed between the operating head and the supply line, transversally displacing the operating head with respect to the supply line according to a transversal pitch equal to the transversal pitch by which the lines of pick-up devices are equally distanced and equal to the transversal pitch by which the channels are transversally distanced, for positioning another further line of pick-up devices for taking corresponding articles to a position above compartments of a second series of compartments consecutive to said first series of previously filled compartments, and centering the another further line of pick-up devices with said second series of compartments;
- b8—lowering the operating head and deactivating the another further line of pick-up devices situated above the said second series of compartments, disengaging the relative articles and inserting the articles into the second series of compartments;
- b9—repeating of steps b4, b5, b6, b7 and b8 in order to disengage and insert all the articles borne by the pick-up devices of the operating head;
- b10—raising and returning of the operating head to above the channels for repeating step (b1);
- b11—repeating the steps which follow step (b1), to transfer a number of the articles corresponding to the number of articles already inserted in the second series of compartments.

3. A method for transferring articles picked up from several channels for delivery to a supply line of a packing machine comprising:

- continuously and synchronously moving the channels in a moving direction, the channels being mutually distanced transversally according to a transversal pitch, and having seatings for containing articles, the seatings being equidistanced from each other and having a longitudinal pitch and being transversally aligned;
- continuously moving the supply line in a moving direction parallel to the channels moving direction, the supply line having receiving compartments, each receiving compartment being capable of receiving one article or a stack of articles, the receiving compartments being equidistanced from each other and having a longitudinal pitch equal to the equidistance and longitudinal pitch of the seatings of the channels;

providing an operating head having pick-up devices arranged in longitudinal lines, in a same number as a number of channels, the lines of the pick-up devices being mutually transversally distanced according to a transversal pitch equal to the channels transversal pitch, the pick-up devices of each line being equidistanced according to a longitudinal pitch equal to the longitudinal pitch by which the seatings of the channels are longitudinally equidistanced and being equal to the longitudinal pitch by which the supply line compartments are longitudinally equidistanced and being aligned transversally with the pick-up devices of the remaining lines, spatially moving the operating head along three Cartesian axes while keeping the lines of the pick-up devices constantly parallel to the channels and to the supply line and inserting in each compartment of the supply line a stack of articles with a number of the stacked articles greater than the number of the channels by performing the following steps:

c1—positioning the operating head above the channels, aligning the lines of the pick-up devices with the channels, moving the operating head along the channels moving direction to follow the channels so as to have a zero relative velocity between the operating head and the channels, the pick-up devices centering on the seatings containing the articles and, while maintaining the operating head in a following-mode, following the channels with a zero relative speed, lowering the operating head and using the pick-up devices for picking up an equally-numbered line of articles from each of the channels, raising the operating head to remove the articles from the relative channel seatings;

c2—displacing the operating head to a position above the supply line and positioning a first line of pick-up devices above a first series of compartments of the supply line, the series being equal to the number of the pick-up devices, and, moving the operating head along the moving direction of the supply line to follow the supply line, to have a contemporaneous zero relative velocity between the operating head and the supply line, the pick-up devices centering with said first series of compartments;

c3—lowering the operating head and deactivating the pick-up devices positioned above the compartments of said first series of compartments, disengaging the articles from the pick-up devices with a consequent insertion of the articles in the underlying first series of compartments of the supply line;

c4—raising the operating head and, by maintaining the operating head in the following-mode with zero-relative speed between the head and the supply line, transversally displacing the operating head with respect to the supply line according to a transversal pitch equal to the transversal pitch by which the lines of pick-up devices are equally distanced and equal to the transversal pitch by which the channels are transversally distanced, so as to position a further line of pick-up devices above the first series of compartments and to center the further pick-up devices with said first series of compartments;

c5—lowering the operating head and deactivating the further pick-up devices, disengaging the relative articles and inserting the articles in the underlying first series of compartments above and on top of the corresponding articles previously inserted in the compartments;

c6—repeating the steps c4 and c5 up to completion of inserting of the articles borne by the pick-up devices of all the lines of pick-up devices of the operating head;

c7—raising and returning of the operating head to above the channels for repeating the step c1;

c8—repeating at least the steps c2 and c3, up to completion of the insertion in said first series of compartments of a stack of articles with a predetermined number of articles greater than the number of the channels.

4. A method for transferring articles picked up from several channels for delivery to a supply line of a packing machine comprising:

continuously and synchronously moving the channels in a moving direction, the channels being mutually distanced transversally according to a transversal pitch, and having seatings for containing articles, the seatings being equidistanced from each other and having a longitudinal pitch and being transversally aligned;

continuously moving the supply line in a moving direction parallel to the channels moving direction, the supply line having receiving compartments, each receiving compartment being capable of receiving one article, the receiving compartments being equidistanced from each other and having a longitudinal pitch equal to the equidistance and longitudinal pitch of the seatings of the channels;

providing an operating head having pick-up devices arranged in longitudinal lines, in a same number as a number of channels, the lines of the pick-up devices being mutually transversally distanced according to a transversal pitch equal to the channels transversal pitch, the pick-up devices of each line being equidistanced according to a longitudinal pitch equal to the longitudinal pitch by which the seatings of the channels are longitudinally equidistanced and being equal to the longitudinal pitch by which the supply line compartments are longitudinally equidistanced and being aligned transversally with the pick-up devices of the remaining lines, spatially moving the operating head along three Cartesian axes while keeping the lines of the pick-up devices constantly parallel to the channels and to the supply line and inserting a single article in each compartment of the supply line by performing the following steps:

d1—positioning the operating head above the channels, aligning the lines of the pick-up devices with the channels, moving the operating head along the channels moving direction to follow the channels so as to have a zero relative velocity between the operating head and the channels, the pick-up devices centering on the seatings containing the articles and, while maintaining the operating head in a following-mode, following the channels with a zero relative speed, lowering the operating head and using the pick-up devices for picking up an equally-numbered line of articles from each of the channels, raising the operating head to remove the articles from the relative channel seatings;

d2—displacing the operating head to a position above the supply line and positioning a first line of pick-up devices above a first series of compartments of the supply line, the series being equal to the number of the pick-up devices, and, moving the operating head to follow the supply line, to have a contemporaneous zero relative velocity between the operating head and the supply line, the first line of pick-up devices centering with said first series of compartments, d3—lowering the operating head and deactivating the first line of pick-up devices positioned above the compartments of said first series of compartments, and disengaging the articles for inserting the articles in the underlying first series of compartments;

d4—raising and retracting the operating head by inverting the motion of the operating head with respect to the moving direction of the supply line, then moving the operating head in the supply line moving direction to follow the supply line with zeroing of the relative velocity with respect thereto, and at the same time, transversally displacing the operating head with respect to the supply line according to a transversal pitch equal to the transversal pitch by which the lines of pick-up devices are equally distanced and equal to the transversal pitch by which the channels are transversally distanced, for positioning a further line of pick-up devices for taking corresponding articles above the compartments of a further series of compartments, consecutive to the first series of compartments, and centering the further pick-up devices with said further series of compartments, and then lowering the operating head and deactivating the further pick-up devices situated above said further series of compartments, disengaging therefrom the relative articles and inserting the articles into the compartments of the further series of compartments;

d5—repeating step d4, up to the releasing of all the articles borne by all the lines of the pick-up devices of the operating head so that each compartment of said first and further series of compartments are each filled with a single article.

* * * * *